Jan. 2, 1923.
E. W. EPPLEY.
NONBLINDING LAMP FOR HEADLIGHTS ON VEHICLES.
FILED AUG. 5, 1921.
1,441,074.
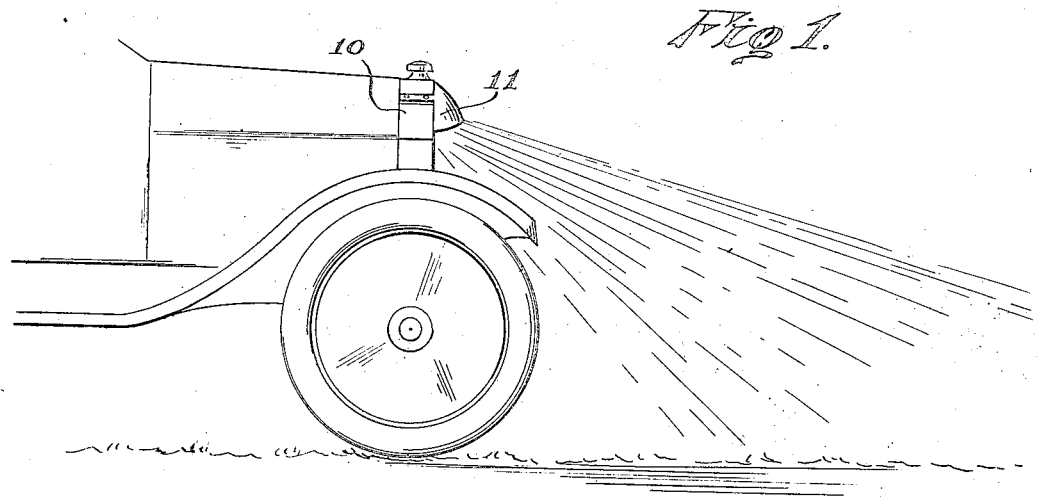
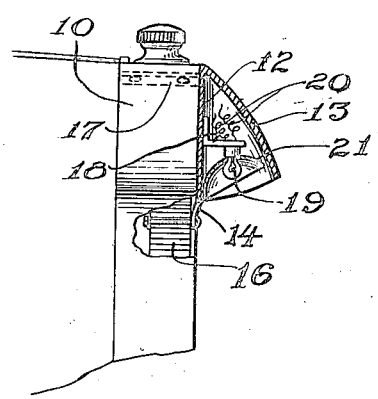
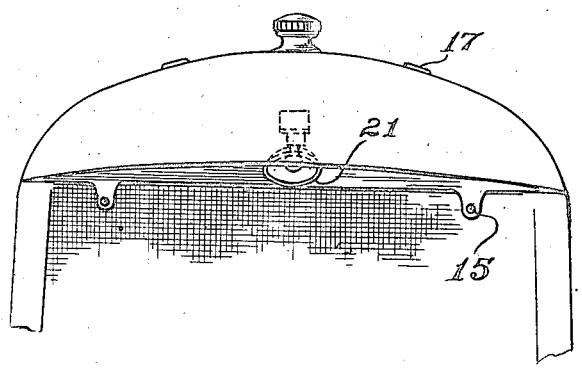
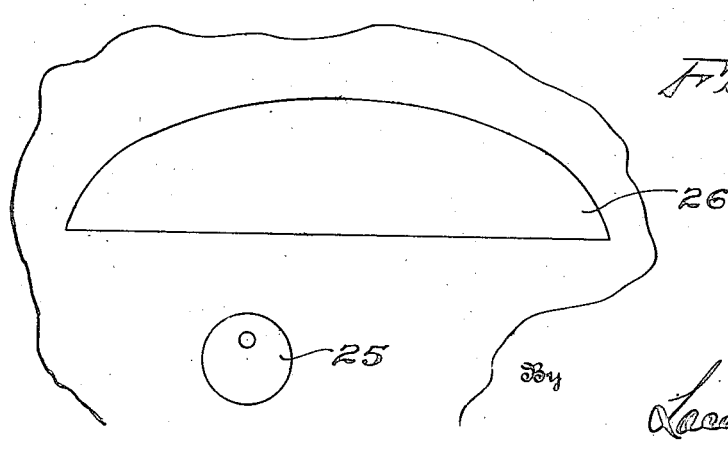
Inventor
E. W. Eppley.
By
Lacey & Lacey, Attorneys Patented Jan. 2, 1923.

1,441,074

UNITED STATES PATENT OFFICE.

ERVIN W. EPPLEY, OF ELYRIA, OHIO.

NONBLINDING LAMP FOR HEADLIGHTS ON VEHICLES.

Application filed August 5, 1921. Serial No. 489,999.

*To all whom it may concern:*

Be it known that I, ERVIN W. EPPLEY, a citizen of the United States, residing at Elyria, in the county of Lorain and State of Ohio, have invented certain new and useful Improvements in Nonblinding Lamps for Headlights on Vehicles, of which the following is a specification.

The present invention relates to a nonblinding headlight particularly designed for use on automobiles. The object of the invention is to construct the headlight so that the light rays will be thrown forward of the vehicle in a downward direction, and that the upward rays as well as the horizontal ones will be obstructed.

Another object of the invention is to so construct the headlight that it will fit across the radiator hood and conform with the contour thereof. In this manner, when attached to the radiator hood, it will make the lamp more secure than ordinarily when the lamps are carried on separate brackets on each side of the radiator.

The lamp is easily removed by simply detaching a couple of screws and as there is no glass window in front of the light, it is impossible for moisture, snow, or dust to collect thereon to obstruct the light rays from going in the desired direction. The light is enclosed on all sides except the bottom, and the shade gives a perfect protection for the light in all kinds of weather without dimming or obscuring the light at any time.

One embodiment of the invention is illustrated in the accompanying drawing, in which—

Figure 1 shows a side elevation of the front end of an automobile with the lamp attached;

Figure 2 shows the lamp in longitudinal section attached to the radiator of an automobile;

Figure 3 is a front view of a portion of the radiator with the lamp attached; and Figure 4 shows diagrammatically how the shade and a reflector for a light may be stamped out of a sheet of metal.

Reference numeral 10 denotes the front end of the radiator hood on an automobile to which the lamp 11 is attached. The lamp consists of a flat rear wall 12 and a dome shaped front wall 13, the latter being curved in a horizontal plane to an elliptical or parabolic shape so that it stands furthest away from the rear wall at its middle line and joins the rear wall along the upper and side edges. The upper and side contour of the shade 11 conforms with that of the top of the radiator, and the shade is preferably pressed out of one piece of metal as shown in Figure 4 so that the front wall is integral with the rear wall. But the two walls might also be pressed or stamped separately and then welded together along the upper and side edges to obtain the same shape as indicated.

At the lower edge of the rear wall 12 are provided a pair of ears 14 for securing the shade by means of bolts 15 to the radiator screen 16. A couple of straps 17 are provided on the upper side of the shade. These may be stamped out of the rear wall 12 or made from separate pieces welded or riveted to the rear wall. These straps are turned rearwardly so as to rest on the top of the radiator and engage with studs or bolts thereon.

A bracket 18 for an electric bulb 19 is attached to the rear wall 12. Instead of an electric bulb, acetylene or other lamp may of course be used. When the electric bulb is used, suitable connection 20 running to a battery and provided with a switch, is supplied. It is preferable to have a reflector 21 over the lamp and it will be seen from Figures 1 and 2 that the position of the reflector and light within the shade 11 is such that the uppermost rays from the light are thrown slightly below a horizontal plane. As none of the rays in this manner can be directed upwardly or above that horizontal plane, the light will not be blinding for approaching vehicles or pedestrians.

In Figure 4 is shown a practical manner of stamping out the blanks for the shade and reflector from a sheet of metal, the circular portion 25 representing a blank for the reflector and a semi-oval cut 26 representing the stamped out portion for the shade.

It is evident that more than one light may be put under the shade and that they may have separate switches so that they may be made to burn separately or all together.

In a modified form of the invention the lamp may constitute a part of the radiator shell. That is to say the rear wall 12 of the lamp is integral with the front wall of the radiator shell 10 and pressed out of one sheet of metal together with the dome shaped front wall 13 of the lamp. In this case there will be no ears for attaching the lamp and the bracket 18 for an electric bulb 19 will then be secured either to the rear wall or the front wall of the lamp.

Having thus described the invention what is claimed as new is:

1. A non-blinding lamp for headlights, comprising a shade and a bracket for a light attached within said shade; said shade having a flat rear wall and a dome-like front wall, the lower edge of said front wall being adapted to obstruct all rays from the light above the horizontal, the upper contour of said shade conforming to the outline of the radiator hood of an automobile.

2. A non-blinding lamp for headlights, comprising a shade and a bracket for a light attached within said shade; said shade having a flat rear wall and a dome-like front wall, the lower edge of said front wall being adapted to obstruct all rays from the light above the horizontal, the upper contour of said shade conforming to the outline of the radiator hood of an automobile, said rear wall being provided with ears for securing the lamp to said radiator hood.

3. A non-blinding lamp for automobile headlights, comprising a shade, said shade having a flat rear wall and a dome-like front wall integral therewith, a bracket provided with a reflector for a light attached to said rear wall, the relative position between said reflector and the lower edge of the said front wall being such that all rays from said light above the horizontal will be obstructed by said lower edge, said rear wall being provided with downwardly projecting ears for bolts attaching the shade to the radiator of an automobile, straps being provided at the upper edge of said rear wall for engaging with the top of said radiator.

4. A non-blinding lamp for automobile headlights, comprising a shade, said shade having a flat rear wall and a dome-like front wall integral therewith, a bracket provided with a reflector for a light attached to said rear wall, the relative position between said reflector and the lower edge of the said front wall being such that all rays from said light above the horizontal will be obstructed by said lower edge, said rear wall being provided with downwardly projecting ears for bolts attaching the shade to the radiator of an automobile, straps being provided at the upper edge of said rear wall for engaging with the top of said radiator, the contour of the upper and side portions of said shade conforming to the outline of said radiator.

In testimony whereof I affix my signature.

ERVIN W. EPPLEY. [L. S.]